No. 870,603. PATENTED NOV. 12, 1907.
C. G. WATSON.
SHIPPING PACKAGE.
APPLICATION FILED MAY 10, 1906.
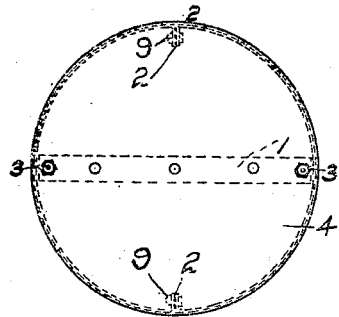
Fig. 1.
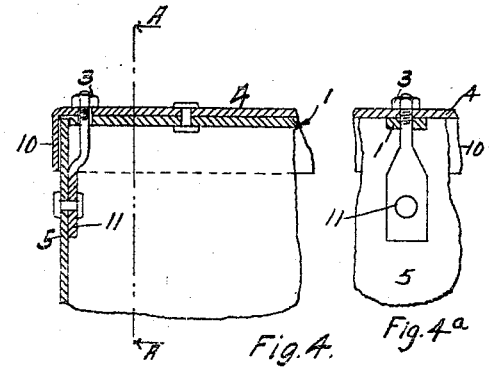
Fig. 4.  Fig. 4ª
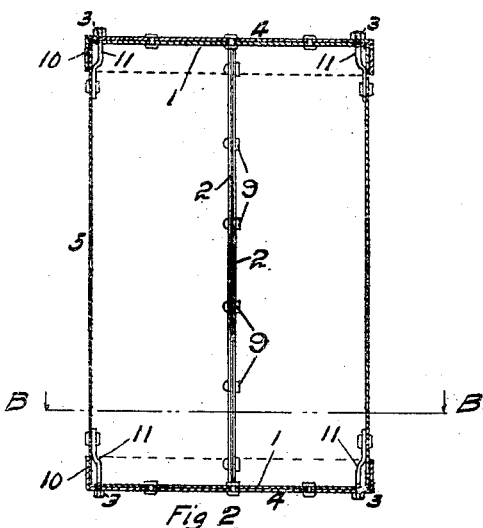
Fig 2
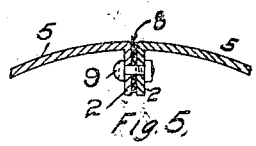
Fig. 5.
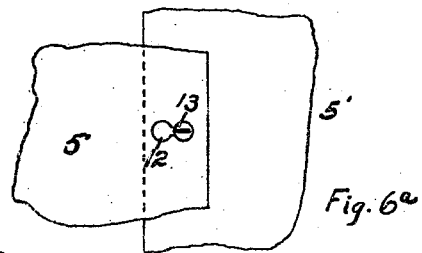
Fig. 6ª
Fig 6
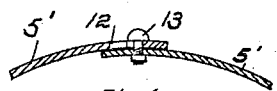
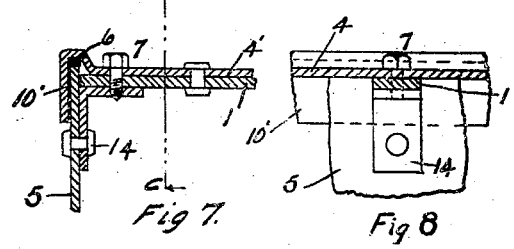
Fig 7.  Fig 8
WITNESSES:
Roy Wallis.
L. H. Marshall
INVENTOR
Chas. G. Watson.
BY
Geo. B. Willcox. ATTORNEY

UNITED STATES PATENT OFFICE.

CHARLES G. WATSON, OF MOUNT MORRIS, MICHIGAN.

SHIPPING-PACKAGE.

No. 870,603.      Specification of Letters Patent.      Patented Nov. 12, 1907.

Application filed May 10, 1906. Serial No. 316,092.

*To all whom it may concern:*

Be it known that I, CHARLES G. WATSON, a citizen of the United States, residing at Mount Morris, in the county of Genesee and State of Michigan, have invented certain new and useful Improvements in Shipping-Packages; and I do hereby declare the following to be a full, clear, and exact description of the invention, such as will enable others skilled in the art to which it appertains to make and use the same.

My invention relates to metallic shipping receptacles, and more particularly to that class known as knock-down shipping cans.

Heretofore, manufacturers of bakery products, as crackers, cakes and the like, as well as manufacturers of grocers' goods as sugar, flour or whatnot, have been accustomed to forwarding these goods to the dealer in metallic shipping cases which cannot be knocked down, or in wooden barrels, kegs and other like receptacles, for which an extra charge is made, the dealer being credited with the amount of such charge upon the return of the receptacles to the manufacturers. Obviously, the receptacles when constructed of wood very soon require repairs, and in any event do not long withstand the rough handling to which they are subjected during shipment. Furthermore, in returning the empties to the owner, considerable space is occupied, resulting in expense.

One object, therefore, of my invention is the provision of a receptacle which can be knocked down to occupy a small space during shipment.

Another object is the provision of a strong, safe receptacle capable of withstanding injury.

Other objects are the provision of a receptacle which can be easily and cheaply manufactured and which can be quickly knocked down for shipment and reassembled or set up to receive the desired commodity.

My invention also consists in a novel means for fastening and retaining the heads or covers in position as well as in other features and combinations of parts such as will be more fully set forth hereinafter and particularly pointed out in the claims.

In the accompanying drawings, wherein I have illustrated certain embodiments of my invention, Figure 1 is a top plan view of one form of my invention, Fig. 2 is a vertical sectional view showing the parts in assembled position, Fig. 3 is a horizontal cross sectional view taken on line B B of Fig. 2 and looking in the direction in which the arrows point. Fig. 4 is a detail cross sectional view on an enlarged scale, showing one means for securing the head or cover to the body of the receptacle, Fig. 4ª is a similar view taken on the line A A of Fig. 4, Fig. 5 is a detail view in cross section showing the seam in the body portion of the receptacle provided with packing to render the receptacle water-tight, Fig. 6 is a detail view in cross section showing one means for connecting the opposing edges of the body portion of a receptacle, Fig. 6ª is a detail side view of the same, Fig. 7 is a detail view in cross section illustrating another method of securing the head or cover to the body portion of the receptacle, and Fig. 8 is a similar view taken on the line C C of Fig. 7.

My invention comprises essentially a body portion 5 which is preferably constructed of a single piece of sheet or other metal bent into cylindrical form and having its meeting edges secured together by means which easily admit of the disassembling of the receptacle, and heads or covers 4 4 located at and removably secured to the opposite ends of the body portion to form a barrel, cask, keg or other shaped receptacle.

In the form shown in Figs. 1, 2, 3, 4, 4ª and 5, the body portion of the receptacle is formed of two semi-cylindrical members 5 5, adapted to have their concaved faces opposing each other when in assembled position, the abutting longitudinal edges of the members being each provided with inturned flanges 2 2 apertured to receive the bolts 9 9 whereby the members are removably connected to each other, and in the event that a perfectly water-tight receptacle is desired, a suitable packing, as 8 (see Fig. 5) may be placed between the inturned flanges, the bolts 9 9 passing through the flanges and the interposed packing.

For closing the opposite ends of the cylindrical body portion, thus formed, I may use the heads or covers 4 4 shown in Figs. 1 and 4, the heads each being preferably provided with the flange 10 adapted to surround and embrace the upper and lower edges of the cylindrical body to assist in bracing the latter. The heads are preferably provided with the reinforcing strips 1 1 riveted or otherwise secured to the heads.

As one means for securing the heads in position on the body, I may provide the lug bolts 11 11 secured to the inner perimeter of the body and being slightly offset inwardly as shown, the outer ends of said lug bolts passing through apertures formed in the reinforcing strips and in the heads, nuts 3 3 being applied to the extreme ends of the lug bolts and screwed down on the cover to hold the latter tightly in position, and if desired packing such as shown at 6 in Fig. 7 may be interposed between the edges of the body and the heads to form a water-tight joint. Such a receptacle can be easily and cheaply constructed of rolled or stamped metal which may or may not be resilient, as desired, the sections or members 5 5 nesting together when the article is shipped, whereby considerable expense is avoided. After the receptacle has been filled with the desired commodity, which may be liquid if the packing is employed, the upper head is fixed in position and the receptacle shipped to the dealer, who has only to remove one head to obtain access to the goods. And when the receptacle is empty, it can be knocked down by removing the nuts 3 3 and the bolts 9 9 and returned to the owner.

It is obvious that the body, instead of being made in two sections, may be a single flexible and preferably resilient piece of metal bent into a cylinder and fastened by the bolts 9 9.

In Figs. 6 and 6ᵃ I have shown a slightly modified form of fastening means designed more particularly for a light receptacle adapted to contain solids, the body of which is composed of a single sheet 5' of resilient metal bent into a cylinder, one of the meeting edges of which is provided with a corset slot 12 to receive the pin 13 carried by the opposite edge. This form is easily knocked down and can be quickly set up when needed.

In Figs. 7 and 8 I have illustrated a different form of cover or head and fastening means, the former comprising a depressed disk 4' having a flange 10' embracing the edge of the body as in Fig. 2, packing 6 being inserted between the edge of the body and the cover to form a tight joint. Within the body is secured an angular bracket 14 upon which the cover may be supported and to which it is secured by means of the capscrews 7 7 extending through the cover and engaging the apertures in the brackets, the heads of the bolts lying below the plane of the edge of the covers or heads.

It is obvious that the means for fastening the covers as shown in Figs. 7 and 8 might be substituted in place of the fastening means shown in Figs. 4 and 4ᵃ and that either might be used with a cylindrical body formed as indicated in Figs. 6 and 6ᵃ.

The material of which the receptacle is to be constructed would preferably be sheet steel or iron of various thicknesses, and plain or galvanized. The head may be pressed or stamped and any of the usual means for strengthening the shell or heads may be used, such as hoops or corrugations.

It is evident that many changes might be made in the forms and arrangements of the several parts described without departing from the spirit and scope of my invention, and hence I do not wish to limit myself to the exact construction herein set forth.

Having thus fully described my invention, what I claim as new is:—

1. A knockdown metallic receptacle comprising a body portion composed of a single sheet of resilient material, one longitudinal edge of which is provided with slots, studs on the opposite edge adapted to project through the slots when the meeting edges are brought together, depressed heads receivable in the opposite ends of the body portion, the heads adapted to prevent the meeting edges from springing together, angular brackets fastened to the inner periphery of the body portion near the opposite ends and fastening means passing through the heads and engaging the brackets.

2. A knockdown metallic receptacle comprising a body portion composed of a single sheet of resilient material, one longitudinal edge of which is provided with slots, studs on the opposite edge adapted to project through the slots when the meeting edges are brought together, and depressed heads receivable in the opposite ends of the body portion, the heads adapted to prevent the meeting edges from springing together.

In testimony whereof I affix my signature, in presence of two witnesses.

CHAS. G. WATSON.

Witnesses:
H. G. MANN,
SUSIE WATERS.